(12) United States Patent
Liu et al.

(10) Patent No.: US 10,606,049 B2
(45) Date of Patent: Mar. 31, 2020

(54) ULTRA-SHORT DISTANCE PROJECTION LENS WITH REFRACTIVE MERIDIONAL IMAGE SURFACE AND REFRACTIVE SAGITTAL IMAGE SURFACE BEING ISOLATED

(71) Applicant: ZHEJIANG CRYSTAL-OPTECH.CO., LTD., Taizhou, Zhejiang Province (CN)

(72) Inventors: Zhenjie Liu, Taizhou (CN); Wenzi Zhang, Taizhou (CN); Jianjun Zhou, Taizhou (CN)

(73) Assignee: ZHEJIANG CRYSTAL-OPTECH.CO., LTD. (CN)

( * ) Notice: Subject to any disclaimer, the term of this patent is extended or adjusted under 35 U.S.C. 154(b) by 457 days.

(21) Appl. No.: 15/344,545

(22) Filed: Nov. 6, 2016

(65) Prior Publication Data

US 2017/0131530 A1    May 11, 2017

(30) Foreign Application Priority Data

Nov. 6, 2015 (CN) .......................... 2015 1 0747888
Nov. 6, 2015 (CN) ..................... 2015 2 0879500 U

(51) Int. Cl.
*G02B 17/00* (2006.01)
*G02B 21/00* (2006.01)
(Continued)

(52) U.S. Cl.
CPC ............... *G02B 17/08* (2013.01); *G02B 5/04* (2013.01); *G02B 13/16* (2013.01);
(Continued)

(58) Field of Classification Search
CPC .... G02B 17/08; G02B 17/0892; G02B 13/16; G02B 17/0852; G03F 7/70225;
(Continued)

(56) References Cited

U.S. PATENT DOCUMENTS 7,466,489 B2 * 12/2008 Beder .................... B82Y 10/00
                                                                355/53
2012/0268949 A1 * 10/2012 Parkyn ..................... F21V 5/04
                                                                362/327

* cited by examiner

*Primary Examiner* — William R Alexander
*Assistant Examiner* — Tamara Y. Washington
(74) *Attorney, Agent, or Firm* — PROI Intellectual Property US

(57) ABSTRACT

The present invention relates to an ultra-short distance projection lens with a refractive meridional image surface and a refractive sagittal image surface being isolated, including a display chip, a refractive lens group, and a rotationally symmetric reflector. The display chip undergoes imaging by the refractive lens group to form, between the refractive lens group and the rotationally symmetric reflector, a meridional intermediate image and a sagittal intermediate image that are isolated, wherein the two images undergo imaging by the rotationally symmetric reflector and astigmatism is eliminated on a screen, to form a clear picture. The present invention has a simple structure, a projection ratio 0.27 to 0.31, a magnification ratio 170 times to 220 times, and ultra-small distortion, has an optical structure that cancels out astigmatism, high resolution, very desirable tolerance, and relatively low mounting precision requirements on optical parts, and has a very high yield in mass production.

7 Claims, 3 Drawing Sheets

(51) Int. Cl.
*G02B 23/00* (2006.01)
*G02B 17/08* (2006.01)
*G02B 13/16* (2006.01)
*G02B 27/00* (2006.01)
*G02B 5/04* (2006.01)
*G03B 21/28* (2006.01)
*G03B 21/14* (2006.01)

(52) U.S. Cl.
CPC ....... *G02B 27/0025* (2013.01); *G03B 21/147* (2013.01); *G03B 21/28* (2013.01)

(58) Field of Classification Search
CPC ............... G03F 7/70275; G03F 7/7015; G03F 7/70233; G03B 21/28; G03B 21/147; G03B 21/10; G03B 21/142; G03B 21/2066; G03B 21/005; H04N 9/3102
USPC ........................................................ 359/364
See application file for complete search history.

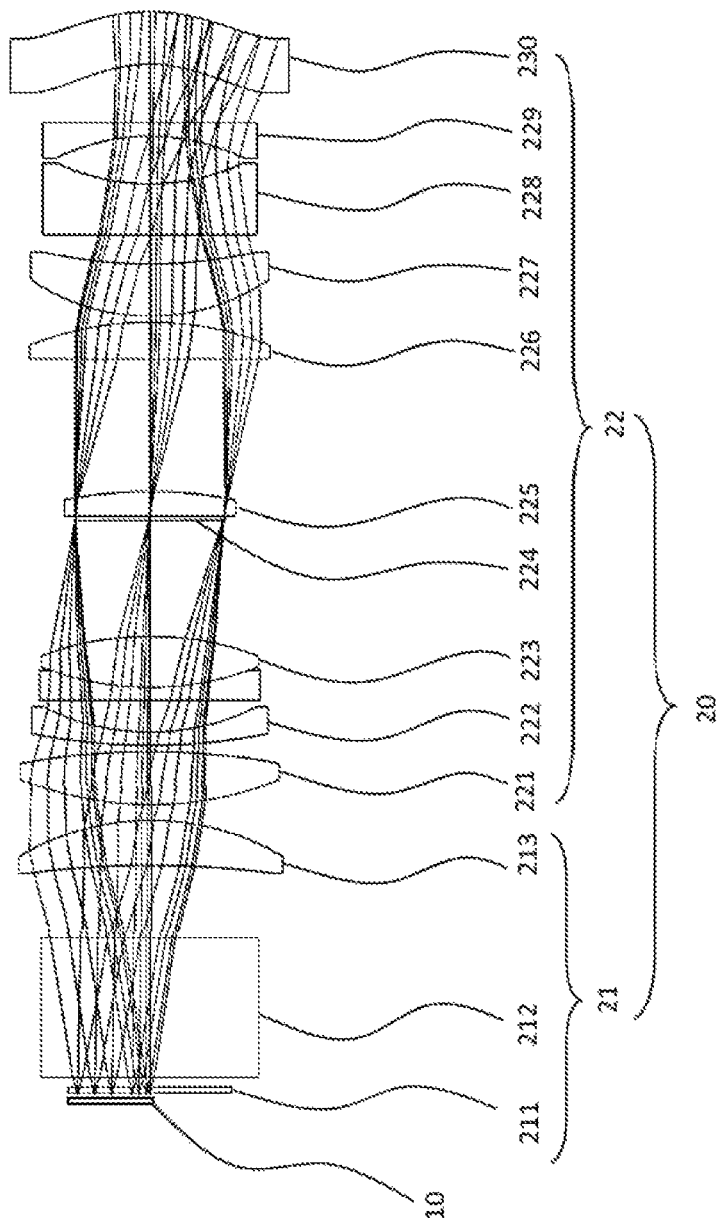

ULTRA-SHORT DISTANCE PROJECTION LENS WITH REFRACTIVE MERIDIONAL IMAGE SURFACE AND REFRACTIVE SAGITTAL IMAGE SURFACE BEING ISOLATED

CROSS REFERENCE TO RELATED APPLICATIONS

The present application claims priority to Chinese Patent Applications CN 2015 107 478 88.X filed on Nov. 6, 2015 and CN 2015 208 795 00.7 filed on Nov. 6, 2015.

TECHNICAL FIELD

The present invention relates to an ultra-short distance projection lens with a refractive meridional image surface and a refractive sagittal image surface being isolated.

BACKGROUND

At present, a conventional projection lens usually has several deficiencies such as a large focal length, a small field of view, and a large throw ratio. However, with the development of projectors, projection and display of large size pictures become increasingly popular among consumers. A common projection lens can no longer satisfy a requirement of projection of a large-size picture in a small space, and such a requirement becomes one of the important reasons that restrict the rapid development of projectors. Although some existing projectors have a throw ratio less than 1, for reasons such as low contrast, relatively poor resolution, large chromatic aberration, and relatively large distortion, such projectors cannot fulfill market demands. With the ongoing development of projection technologies, a throw ratio of an ultra-short distance projection lens may already be less than 0.3, which well satisfies the requirement of projection of a large-size picture in a small space.

An existing ultra-short distance projection lens has a complex structure. Generally, multiple aspheric lenses are applied to correct aberrations. However, the multiple aspheric lenses may lead to a complex structure of the ultra-short distance projection lens, undesirable tolerance, and a high demand on the precision of assembly. Meanwhile, in some ultra-short distance projection lenses, a free-form reflective mirror is used to effectively correct distortion and eliminate astigmatism. Compared with a rotationally symmetric reflective mirror, a free-from reflective mirror can keep distortion and astigmatism at a low level. However, it is very difficult to precisely test a free-form reflective mirror, and therefore it is no easy to control the shape of the free-form surface in mass production. Meanwhile, the free-form reflective mirror has a very strict requirement on tolerance and a high demand on the precision of assembly, leading to a low yield in the mass production. Moreover, in some ultra-short distance projection lenses, a rotationally symmetric reflective mirror is used. Regardless of advantages such as simple structure, easy testing, and easy production, a rotationally symmetric reflective mirror has different curvature distribution in the meridional direction and in the sagittal direction, thus causing a large astigmatism. The overlapping meridional intermediate image and sagittal intermediate image are separated by the rotationally symmetric reflector, which means that the projection lens cannot throw a clear image.

SUMMARY

To solve the problems in the prior art, the present invention provides a technical solution of an ultra-short distance projection lens with a refractive meridional image surface and a refractive sagittal image surface being isolated.

The ultra-short distance projection lens with a refractive meridional image surface and a refractive sagittal image surface being isolated includes a display chip, a refractive lens group, and a rotationally symmetric reflective mirror, where the display chip undergoes imaging by the refractive lens group to form, between the refractive lens group and the rotationally symmetric reflective mirror, a meridional intermediate image and a sagittal intermediate image that are isolated, and the meridional intermediate image and the sagittal intermediate image that are isolated undergo imaging by the rotationally symmetric reflective mirror and astigmatism is eliminated on a screen, to form a clear picture. In other words, the display chip can be imaged by the refractive lens, the image are separated in the meridional direction and the sagittal direction, and located between the refractive lens group and the rotationally symmetric reflective mirror, the separated image be reflected on the screen by the rotationally symmetric reflective mirror; the final image is very clear without astigmatism.

In the ultra-short distance projection lens with a refractive meridional image surface and a refractive sagittal image surface being isolated, the refractive lens group includes a front focusing group and a refractive lens rear focusing group, the refractive lens focusing front group includes a protective glass of the display chip, a TIR prism, and a first glass lens that are sequentially assembled from left to right, and the refractive lens focusing rear group includes a second glass lens, a third glass lens, a fourth doublet glass lens, an aperture stop, a fifth glass lens, a sixth glass lens, a seventh glass lens, an eighth glass lens, a ninth glass lens, and a tenth plastic lens that are sequentially mounted from left to right.

In the ultra-short distance projection lens with a refractive meridional image surface and a refractive sagittal image surface being isolated, the spacing between the protective glass of the display and the TIR prism is 1.25 mm, the spacing between the TIR prism and the first glass lens is 8.2 mm to 8.6 mm, the spacing between the first glass lens and the second glass lens is 1.1 mm to 2.4 mm, the spacing between the second glass lens and the third glass lens is 0.7 mm, the spacing between the third glass lens and the fourth doublet glass lens is 3.67 mm, the spacing between the fourth doublet glass lens and the aperture stop is 13.7 mm, the spacing between the aperture stop and the fifth glass lens is 0, the spacing between the fifth glass lens and the sixth glass lens is 15.25 mm, the spacing between the sixth glass lens and the seventh glass lens is 0.7 mm, the spacing between the seventh glass lens and the eighth glass lens is 3.38 mm, the spacing between the eighth glass lens and the ninth glass lens is 5.46 mm, and the spacing between the ninth glass lens and the tenth plastic lens is 6.67 mm.

In the ultra-short distance projection lens with a refractive meridional image surface and a refractive sagittal image surface being isolated, the thickness of the first glass lens is 5.2 mm, and the radii of curvature of a left side and a right side of the first glass lens are 108.83 mm and 29.1 mm respectively; the thickness of the second glass lens is 6.11 mm, and the radii of curvature of a left side and a right side of the second glass lens are respectively 39.2 mm and 76.9 mm; the thickness of the third glass lens is 1.5 mm, and the radii of curvature of a left side and a right side of the third glass lens are respectively 67.73 mm and 26.58 mm; the thickness of the fourth doublet glass lens is 7.36 mm, and the radii of curvature of a left side and a right side of the fourth doublet glass lens are respectively infinity and 34.4 mm; the thickness of the fifth glass lens is 2.8 mm, and the radii of curvature of a left side and a right side of the fifth glass lens are respectively infinity and 50 mm; the thickness of the sixth glass lens is 4.2 mm, and the radii of curvature of a left side and a right side of the sixth glass lens are respectively infinity and 37.44 mm; the thickness of the seventh glass lens is 6 mm, and the radii of curvature of a left side and a right side of the seventh glass lens are respectively 23.84 mm and 53.74 mm; the thickness of the eighth glass lens is 6 mm, and the radii of curvature of a left side and a right side of the eighth glass lens are respectively infinity and 25.02 mm; the thickness of the ninth glass lens is 1.5 mm, and the radii of curvature of a left side and a right side of the ninth glass lens are respectively 23.7 mm and infinity; and the thickness of the tenth plastic lens is 6 mm, and the radii of curvature of a left side and a right side of the tenth plastic lens are respectively 16.75 mm and 20.96 mm.

In the ultra-short distance projection lens with a refractive meridional image surface and a refractive sagittal image surface being isolated, the two surfaces of the tenth plastic lens are set to be even aspheric surfaces which can expressed as:

$$f(r) = \frac{cr^2}{1+\sqrt{1-(1+k)c^2r^2}} + E_1 r^4 + E_2 r^6 + E_3 r^n + E_4 r^{20}$$

where f(r) is a sag, c is the curvature of the surface, r is the height above the optical axis, $E_n$ is the coefficient of $r^n$, and n is a positive integer.

In the ultra-short distance projection lens with a refractive meridional image surface and a refractive sagittal image surface being isolated, the coefficients of the left-side surface of the tenth plastic lens are as follows: c=−0.05945, k=−06567, $E_1$=3.6202e−005, $E_2$=3.158e−007, $E_3$=−3.9205e−010, and $E_4$=−9.537e−013; and the coefficients of the right-side surface of the tenth plastic lens are as follows: c=−0.04786, k=0.24, $E_1$=3.3421e−005, $E_2$=1.5991e−007, $E_3$=5.6381e−011, and $E_4$=−1.3461e−013.

In the ultra-short distance projection lens with a refractive meridional image surface and a refractive sagittal image surface being isolated, the rotationally symmetric reflective mirror is fitted using odd polynomial surface which can be expressed as:

$$f(r) = \frac{cr^2}{1+\sqrt{1-(1+k)c^2r^2}} + E_1 r + E_2 r^2 + \ldots E_n r^n + E_{10} r^{10}$$

where f(r) is sag, c is the curvature of the surface, r is the height above the optical axis, $E_n$ is the coefficient of $r^n$, and n is a positive integer.

In the ultra-short distance projection lens with a refractive meridional image surface and a refractive sagittal image surface being isolated, the degree of separation between the meridional intermediate image and the sagittal intermediate image depends on the first-order derivative f'(r) and the second-order derivative distribution f''(r) of the rotationally symmetric reflector.

The present invention has a simple structure, a throw ratio of 0.27 to 0.31, and a magnification ratio of 170 to 220; the present invention also features a high optical performance such as a extremely small distortion and astigmatism, high resolution and a desirable tolerance; furthermore, it is easy to assemble and has a high yield in mass production.

BRIEF DESCRIPTION OF THE DRAWINGS

FIG. 3 is a schematic diagram of an optical structure according to the present invention.

REFERENCE NUMERALS AND DENOTATIONS THEREOF

Figure 1:
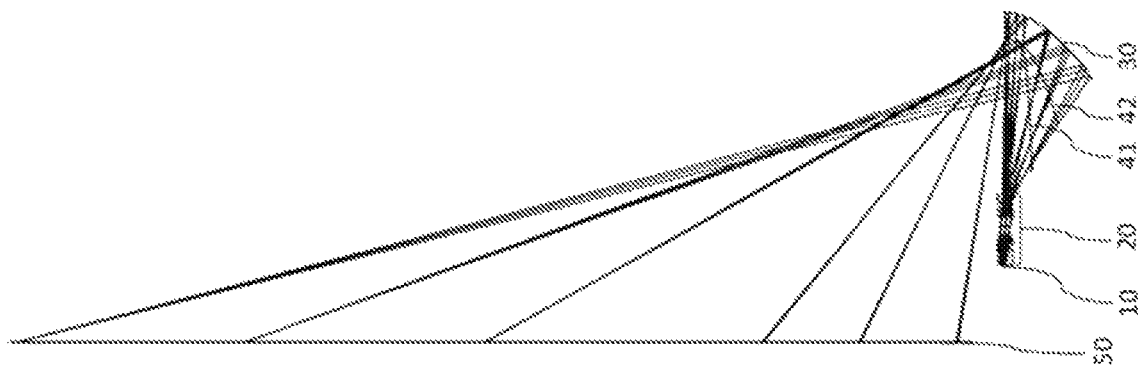
FIG. 1 is a schematic diagram of an ultra-short distance projection lens according to the present invention.

10—display chip, 20—refractive lens group, 30—rotationally symmetric reflective mirror, 40—intermediate image of the display chip, 50—screen, 21—refractive lens focusing front group, 22—refractive lens focusing rear group, 211—protective glass of the display chip, 212—TIR prism, 213—first glass lens, 221—second glass lens, 222—third glass lens, 223—fourth doublet glass lens, 224—aperture stop, 225—fifth glass lens, 226—sixth glass lens, 227—seventh glass lens, 228—eighth glass lens, 229—ninth glass lens, 230—tenth plastic lens, 41—meridional intermediate image, and 42—sagittal intermediate image.

DETAILED DESCRIPTION

The present invention is further described below with reference to the accompanying drawings of the specification:

An ultra-short distance projection lens with a refractive meridional image surface and a refractive sagittal image surface being isolated includes a display chip 10, a refractive lens group 20, and a rotationally symmetric reflector 30. The display chip 10 can be imaged by the refractive lens group 20 to form, between the refractive lens group 20 and the rotationally symmetric reflector 30, a meridional intermediate image 41 and a sagittal intermediate image 42 (a display chip intermediate image 40) that are isolated. The meridional intermediate image and the sagittal intermediate image that are isolated undergo imaging by the rotationally symmetric reflector and astigmatism is eliminated (canceled out) on a screen 50, to form a clear picture.

The rotationally symmetric reflector has different curvature distributions in a meridional direction and in a sagittal direction and therefore causes a large astigmatism. Therefore, after imaging of the meridional intermediate image and the sagittal intermediate image that are overlapped by the rotationally symmetric reflector, clear images cannot be formed on a screen at the same time, resulting in a significant decrease in picture resolution. After imaging of the meridional intermediate image and the sagittal intermediate image that are isolated by rotationally symmetric reflector, isolation between the meridional intermediate image and the sagittal intermediate image is canceled out by the rotationally symmetric reflector, clear images may be formed on the screen at the same time, so that the meridional intermediate image and the sagittal intermediate image are overlapped on the screen to form a clear picture. In the present invention, the refractive lens group is disposed in coordination, the display chip undergoes imaging by the refractive lens group to form the meridional intermediate image and the sagittal intermediate image that are isolated, and the meridional intermediate image and the sagittal intermediate image that are isolated then undergo imaging by the rotationally symmetric reflector to form an image on the screen.

Figure 2:
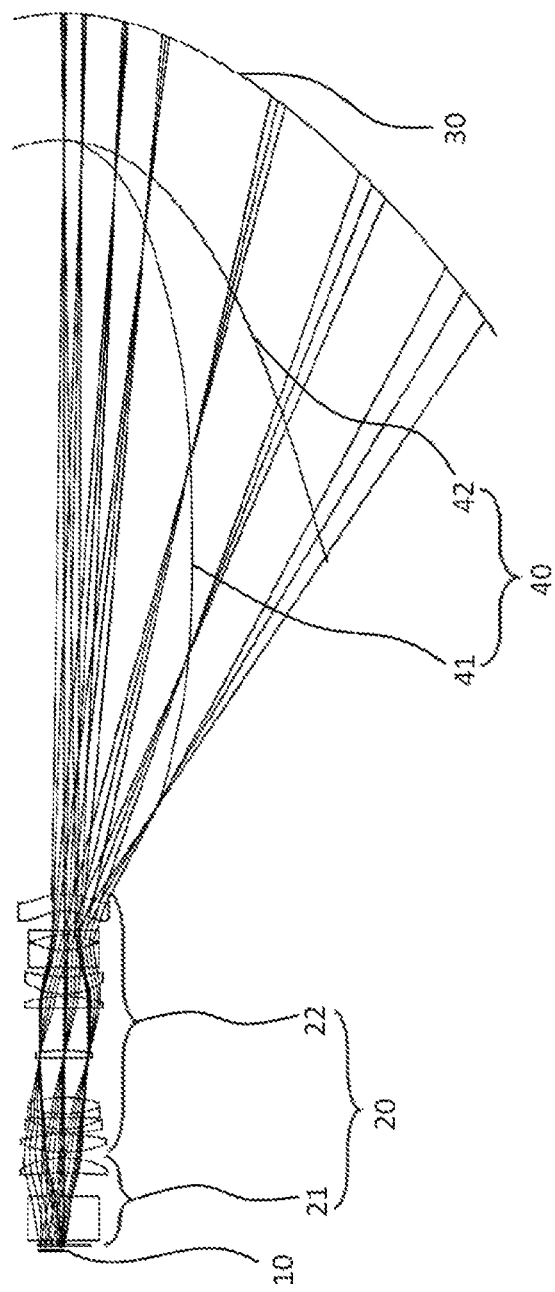
FIG. 2 is a schematic diagram of an intermediate image of a display chip.

As shown in FIG. 2, the refractive lens group 20 includes a front focusing group 21 and a refractive lens rear focusing group 22.

As shown in FIG. 3, the refractive lens focusing front group 21 includes a protective glass of the display chip 211, a TIR prism 212, and a first glass lens 213 that are sequentially disposed from left to right. The refractive lens focusing rear group 22 includes a second glass lens 221, a third glass lens 222, a fourth double-bonding glass lens 223, an aperture stop 224, a fifth glass lens 225, a sixth glass lens 226, a seventh glass lens 227, an eighth glass lens 228, a ninth glass lens 229, and a tenth plastic lens 230 that are sequentially disposed from left to right.

The spacing between the display chip protection glass 211 and the TIR prism 212 is 1.25 mm; a range of the spacing between the TIR prism and the first glass lens 213 is 8.6 mm to 8.2 mm; a range of the spacing between the first glass lens 213 and the second glass lens 221 is 2.4 mm to 1.1 mm; the spacing between the second glass lens 221 and the third glass lens 222 is 0.7 mm; the spacing between the third glass lens 222 and the fourth doublet glass lens 223 is 3.67 mm; the spacing between the fourth doublet glass lens 223 and the aperture stop 224 is 13.7 mm; the spacing between the aperture stop 224 and the fifth glass lens 225 is 0; the spacing between the fifth glass lens 225 and the sixth glass lens 226 is 15.25 mm; the spacing between the sixth glass lens 226 and the seventh glass lens 227 is 0.7 mm; the spacing between the seventh glass lens 227 and the eighth glass lens 228 is 3.38 mm; the spacing between the eighth glass lens 228 and the ninth glass lens 229 is 5.46 mm; and the spacing between the ninth glass lens 229 and the tenth plastic lens 230 is 6.67 mm.

The thickness of the first glass lens 213 is 5.2 mm, and the radii of curvature of a left side and a right side of the first glass lens 213 are respectively 108.83 mm and 29.1 mm; the thickness of the second glass lens 221 is 6.11 mm, and the radii of curvature of a left side and a right side of the second glass lens 221 are respectively 39.2 mm and 76.9 mm; the thickness of the third glass lens 222 is 1.5 mm, and the radii of curvature of a left side and a right side of the third glass lens 222 are respectively 67.73 mm and 26.58 mm; the thickness of the fourth doublet glass lens 223 is 7.36 mm, and the radii of curvature of a left side and a right side of the fourth doublet glass lens 223 are respectively infinity and 34.4 mm; the thickness of the fifth glass lens 225 is 2.8 mm, and the radii of curvature of a left side and a right side of the fifth glass lens 225 are respectively infinity and 50 mm; the thickness of the sixth glass lens 226 is 4.2 mm, and the radii of curvature of a left side and a right side of the sixth glass lens 226 are respectively infinity and 37.44 mm; the thickness of the seventh glass lens 227 is 6 mm, and the radii of curvature of a left side and a right side of the seventh glass lens 227 are respectively 23.84 mm and 53.74 mm; the thickness of the eighth glass lens 228 is 6 mm, and the radii of curvature of a left side and a right side of the eighth glass lens 228 are respectively infinity and 25.02 mm; the thickness of the ninth glass lens 229 is 1.5 mm, and the radii of curvature of a left side and a right side of the ninth glass lens 229 are respectively 23.7 mm and infinity; and the thickness of the tenth plastic lens 230 is 6 mm, and the radii of curvature of a left side and a right side of the tenth plastic lens 230 are respectively 16.75 mm and 20.96 mm.

In the present invention, expressions of two surfaces from left to right of the tenth plastic lens 230 are set to be an even-order aspheric expression, an expression form of which is:

$$f(r) = \frac{cr^2}{1+\sqrt{1-(1+k)c^2r^2}} + E_1 r^4 + E_2 r^6 + E_3 r^n + E_4 r^{20}$$

where f(r) is a sag, c is a fitted spherical curvature, r is a distance between a projection of coordinates of a curved surface point on a vertical optical-axis plane and an optical axis, a coefficient of $E_n$ is $r^n$, and n is a positive integer.

Coefficients of a left-side surface of the tenth plastic lens 230 are as follows: c=−0.05945, k=−06567, $E_1$=3.6202e−005, $E_2$=3.158e−007, $E_3$=−3.9205e−010, and $E_4$=−9.537e−013.

Coefficients of a right-side surface of the tenth plastic lens are as follows: c=−0.04786, k=0.24, $E_1$=3.3421e−005, $E_2$=1.5991e−007, $E_3$=5.6381e−011, and $E_4$=−1.3461e−013.

By adjusting the refractive lens group, focusing from 170 times to 220 times can be implemented, and a throw ratio from 0.27 to 0.31 can be implemented.

The display chip undergoes imaging by the refractive lens group to form the meridional intermediate image 41 and the sagittal intermediate image 42 that are isolated. When the view angle, or the field of view, is 0, the meridional intermediate image 41 and the sagittal intermediate image 42 are overlapped. The degree of separation between the meridional intermediate image 41 and the sagittal intermediate image 42 increases with the increase of field of view. At the edge field of view—the largest field of view, the isolation between the meridional intermediate image 41 and the sagittal intermediate image 42 reaches a maximum value.

Compared with the rotationally symmetric reflector that has a free curved surface, the rotationally symmetric reflector 30 that has rotational symmetry has better processibility, detectability, and tolerance. However, the rotationally symmetric reflector 30 that has rotational symmetry has different curvature distributions in a meridional direction and a sagittal direction for incident light, which causes that after imaging of the meridional intermediate image 41 and the sagittal intermediate image 42 of the display chip 10 by the rotationally symmetric reflector 30, the meridional intermediate image 41 and the sagittal intermediate image 42 cannot be overlapped, clear astigmatism occurs, and therefore a clear picture cannot be formed on the screen. In the present invention, the refractive lens group 20 has an effect of isolating the meridional intermediate image 41 and the sagittal intermediate image 42 of the display chip 10, so that astigmatism of the meridional intermediate image 41 and the sagittal intermediate image 42 after imaging by the rotationally symmetric reflector 30 can be effectively canceled, and distortion can be reduced, so as to form a clear picture on the screen.

In the present invention, an expression of the rotationally symmetric reflector 30 having rotational symmetry is set to be an odd-order aspheric expression, an expression form of which is:

$$f(r) = \frac{cr^2}{1+\sqrt{1-(1+k)c^2r^2}} + E_1 r + E_2 r^2 + \ldots E_n r^n + E_{10} r^{10}$$

where f(r) is a surface height, c is a fitted spherical curvature, r is a distance between a projection of coordinates of a curved surface point on a vertical optical-axis plane and an optical axis, a coefficient of $E_n$ is $r^n$, and n is a positive integer.

The display chip 10 undergoes imaging by the refractive lens group to form the meridional intermediate image 41 and the sagittal intermediate image 42 that are isolated, and the degree of isolation between the meridional intermediate image 41 and the sagittal intermediate image 42 depends on a first-order derivative distribution) f'(r) and a second-order derivative distribution f''(r) of the rotationally symmetric reflector 30.

Compared with the prior art, the present invention has an ultra-low throw ratio, an ultra-high magnification ratio, and ultra-small distortion. Meanwhile, a catadioptric ultra-short distance projection lens of the present invention has an optical structure that eliminates astigmatism and therefore has ultra-high resolution. The catadioptric ultra-short distance projection lens of the present invention has a simple structure, in which only one aspheric lens, 10 glass lenses, and one rotationally symmetric reflector are used, and therefore is easy to process, is convenient to perform detection, has very desirable tolerance, and has relatively low mounting precision requirements on optical parts. Eventually, the ultra-short distance projection lens product has a very high yield in mass production and has a very desirable actual imaging effect.

What is claimed is:

1. An ultra-short distance projection lens with a refractive meridional image surface and a refractive sagittal image surface being isolated, comprising a display chip, a refractive lens group, and a rotationally symmetric reflector, wherein the display chip undergoes imaging by the refractive lens group to form, between the refractive lens group and the rotationally symmetric reflector, a meridional intermediate image and a sagittal intermediate image that are isolated, and the meridional intermediate image and the sagittal intermediate image that are isolated undergo imaging by the rotationally symmetric reflector and astigmatism is eliminated on a screen, to form a clear picture;

wherein the refractive lens group comprises a refractive lens focusing front group and a refractive lens focusing rear group, the refractive lens focusing front group comprises a display chip protection glass, a TIR prism, and a first glass lens that are sequentially disposed from left to right, and the refractive lens focusing rear group comprises a second glass lens, a third glass lens, a fourth double-bonding glass lens, an aperture stop, a fifth glass lens, a sixth glass lens, a seventh glass lens, an eighth glass lens, a ninth glass lens, and a tenth plastic lens that are sequentially disposed from left to right;

wherein the spacing between the display chip protection glass and the TIR prism is 1.25 mm, the spacing between the TIR prism and the first glass lens is 8.6 mm to 8.2 mm, the spacing between the first glass lens and the second glass lens is 2.4 mm to 1.1 mm, the spacing between the second glass lens and the third glass lens is 0.7 mm, the spacing between the third glass lens and the fourth double-bonding glass lens is 3.67 mm, the spacing between the fourth double-bonding glass lens and the aperture stop is 13.7 mm, the spacing between the aperture stop and the fifth glass lens is 0, the spacing between the fifth glass lens and the sixth glass lens is 15.25 mm, the spacing between the sixth glass lens and the seventh glass lens is 0.7 mm, the spacing between the seventh glass lens and the eighth glass lens is 3.38 mm, the spacing between the eighth glass lens and the ninth glass lens is 5.46 mm, and the spacing between the ninth glass lens and the tenth plastic lens is 6.67 mm.

2. The ultra-short distance projection lens with a refractive meridional image surface and a refractive sagittal image surface being isolated according to claim 1, wherein expressions of two surfaces from left to right of the tenth plastic lens are set to be an even-order aspheric expression, an expression form of which is:

$$f(r) = \frac{cr^2}{1+\sqrt{1-(1+k)c^2r^2}} + E_1 r^4 + E_2 r^6 + E_3 r^n + E_4 r^{20}$$

wherein f(r) is a surface height, c is a fitted spherical curvature, r is a distance between a projection of coordinates of a curved surface point on a vertical optical-axis plane and an optical axis, a coefficient of $E_n$ is $r^n$, and n is a positive integer.

3. The ultra-short distance projection lens with a refractive meridional image surface and a refractive sagittal image surface being isolated according to claim 2, wherein coefficients of a left-side surface of the tenth plastic lens are as follows: c=−0.05945, k=−0.6567, $E_1$=3.6202e−005, $E_2$=3.158e−007, $E_3$=−3.9205e−010, and $E_4$=−9.537e−013; and coefficients of a right-side surface of the tenth plastic lens are as follows: c=−0.04786, k=0.24, $E_1$=3.3421e−005, $E_2$=1.5991e−007, $E_3$=5.6381e−011, and $E_4$=−1.3461e−013.

4. The ultra-short distance projection lens with a refractive meridional image surface and a refractive sagittal image surface being isolated according to claim 1, wherein expressions of two surfaces from left to right of the tenth plastic lens are set to be an even-order aspheric expression, an expression form of which is:

$$f(r) = \frac{cr^2}{1+\sqrt{1-(1+k)c^2r^2}} + E_1 r^4 + E_2 r^6 + E_3 r^n + E_4 r^{20}$$

wherein f(r) is a surface height, c is a fitted spherical curvature, r is a distance between a projection of coordinates of a curved surface point on a vertical optical-axis plane and an optical axis, a coefficient of $E_n$ is $r^n$, and n is a positive integer.

5. The ultra-short distance projection lens with a refractive meridional image surface and a refractive sagittal image surface being isolated according to claim 4, wherein coefficients of a left-side surface of the tenth plastic lens are as follows: c=−0.05945, k=−0.6567, $E_1$=3.6202e−005, $E_2$=3.158e−007, $E_3$=−3.9205e−010, and $E_4$=−9.537e−013; and coefficients of a right-side surface of the tenth plastic lens are as follows: c=−0.04786, k=0.24, $E_1$=3.3421e−005, $E_2$=1.5991e−007, $E_3$=5.6381e−011, and $E_4$=−1.3461e−013.

6. The ultra-short distance projection lens with a refractive meridional image surface and a refractive sagittal image surface being isolated according to claim 1, wherein an expression of the rotationally symmetric reflector is set to be an odd-order aspheric expression, an expression form of which is:

$$f(r) = \frac{cr^2}{1+\sqrt{1-(1+k)c^2r^2}} + E_1 r + E_2 r^2 + \ldots E_n r^n + \ldots + E_{10} r^{10}$$

wherein f(r) is a surface height, c is a fitted spherical curvature, r is a distance between a projection of coordinates of a curved surface point on a vertical optical-axis plane and an optical axis, a coefficient of $E_n$ is $r^n$, and n is a positive integer.

7. The ultra-short distance projection lens with a refractive meridional image surface and a refractive sagittal image surface being isolated according to claim 6, wherein a degree of isolation between the meridional intermediate image and the sagittal intermediate image depends on a first-order derivative distribution f'(r) and a second-order derivative distribution f"(r) of the rotationally symmetric reflector.

* * * * *